United States Patent [19]

Mauer et al.

[11] 3,999,248
[45] Dec. 28, 1976

[54] APPARATUS AND METHOD FOR KNITTING PROTEINACEOUS FRAGMENTS INTO A UNIFIED MASS

[75] Inventors: James E. Mauer; Benedict Di Gerlando, both of Plainfield, Ill.

[73] Assignee: Zartic Frozen Meats, Inc., Plainfield, Ill.

[22] Filed: Jan. 6, 1975

[21] Appl. No.: 538,722

[52] U.S. Cl. .................................. 17/32; 17/46; 426/513
[51] Int. Cl.² ............................................ A22C 7/00
[58] Field of Search .................. 17/32, 1, 25, 45; 426/513, 274, 621, 519, 518, 516, 517

[56] References Cited

UNITED STATES PATENTS

| | | |
|---|---|---|
| 2,803,458 | 8/1957 | Holly .................................. 17/32 |
| 3,312,997 | 4/1967 | Merrels ............................... 17/32 |
| 3,489,104 | 1/1970 | Wolff .................................. 17/32 |
| 3,917,856 | 11/1975 | Wong et al. ........................ 426/516 |

Primary Examiner—Louis G. Mancene
Assistant Examiner—James D. Hamilton
Attorney, Agent, or Firm—Granger Cook, Jr.; Jerold A. Jacover

[57] ABSTRACT

An apparatus and method for knitting proteinaceous fragments into a unified mass is disclosed. The apparatus is adapted to accumulate proteinaceous fragments into a wad, and then knit the fragments together to form a unified proteinaceous patty. The method includes the steps of accumulating the meat fragments into a wad, and then knitting the wad to form a unified proteinaceous patty.

12 Claims, 6 Drawing Figures

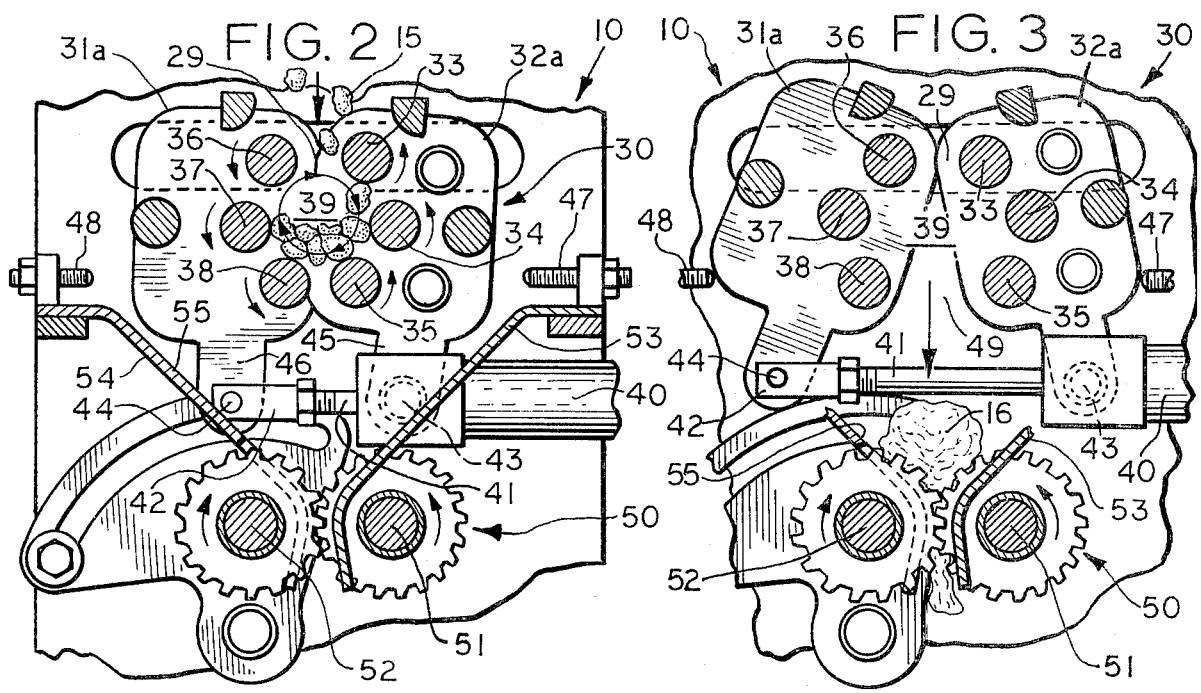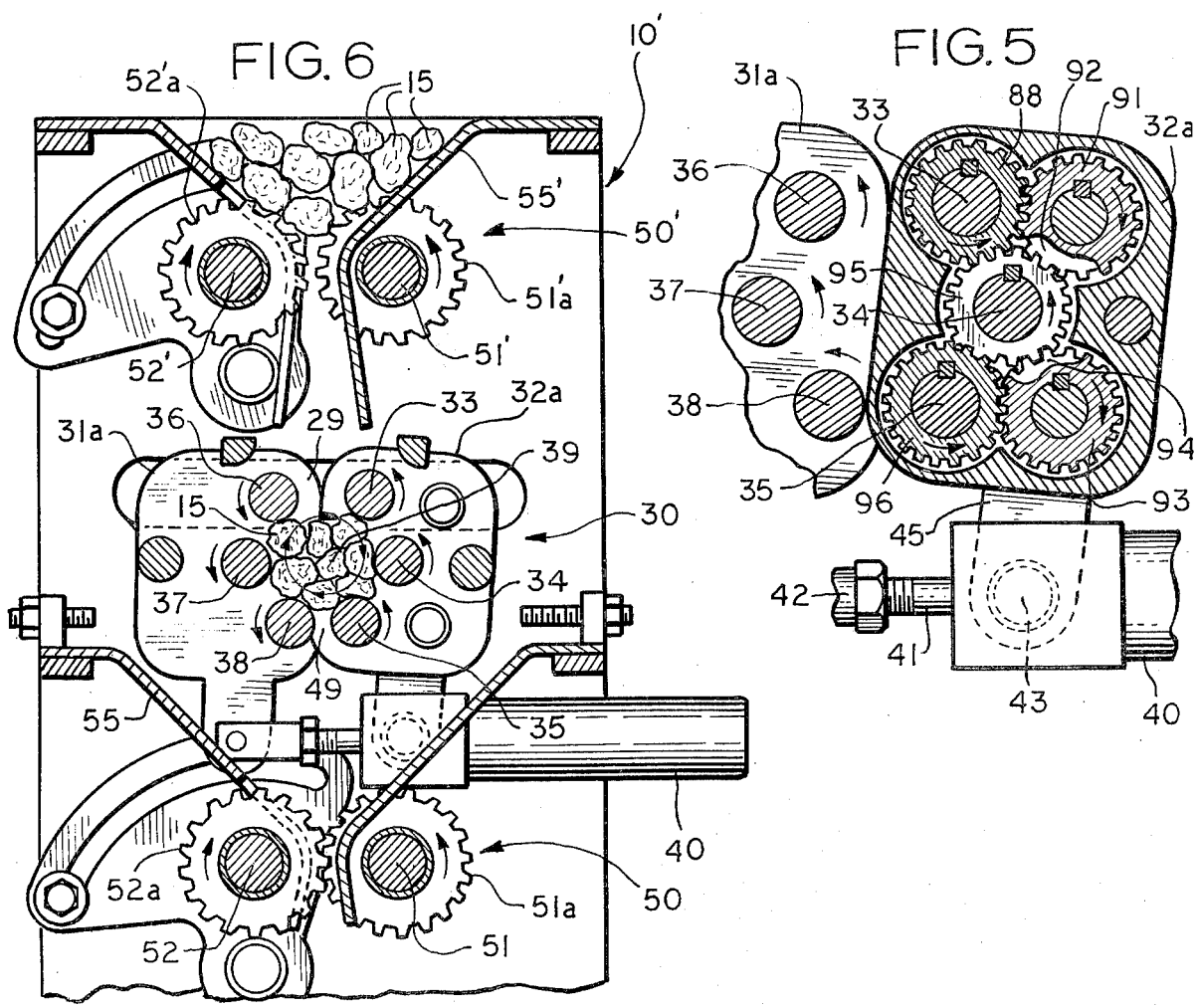

APPARATUS AND METHOD FOR KNITTING PROTEINACEOUS FRAGMENTS INTO A UNIFIED MASS

BACKGROUND OF THE INVENTION

This invention relates to an apparatus and method for knitting proteinaceous fragments into a unified mass, and in particular, to an apparatus and method for accumulating and knitting fragments of meat into thin patties, sometimes referred to as cube steaks.

In the course of butchering, dressing and preparing meat products for sale, numerous meat scraps or fragments inevitably result. Due to the relatively high cost of meat, it is desirable to salvage even the smallest meat fragments. Numerous methods have been suggested and employed for salvaging such fragments. One such method includes grinding the fragments into hamburger, another pertains to mincing the fragments for insertion into frankfurter casings, and a third pertains to combining the fragments with other ingredients to form pet foods products. Though these and other salvaging methods desirably provide a financial return on the meat fragments, resulting in some savings, they are subject to certain drawbacks. More particularly, the salvageable meat fragments are often trimmed from the choicest meat cuts, and therefore their value is substantially reduced by converting them into products such as hamburger, frankfurters, or pet foods which generally bring a much lower price.

The apparatus and method of the invention provide means for converting fragments trimmed from choice meat cuts into a meat product which will bring a price more commensurate with the quality of the meat from which the fragments originated. More particularly, the apparatus and method of the invention enable meat fragments to be knitted together to form tasty, high quality proteinaceous food products of the type sometimes referred to as cube steaks.

Though some processes for knitting together pieces of proteinaceous material, such as meat, are disclosed in the prior art, these disclosures generally teach methods accomplished primarily by manual means, or pertain to pieces of meat much larger than the scraps or fragments salvageable by the apparatus and method of the invention. In contrast, the present invention relates to a highly automated process, capable of continuous cube steak production. Moreover, the invention works equally well with very small fragments, thereby maximizing the amount of salvageable meat.

Accordingly, it is a primary object of this invention to provide an improved apparatus for knitting together proteinaceous food fragments.

It is another object of this invention to provide an improved, highly automated method for knitting together proteinaceous food fragments.

It is a further object of this invention to provide an improved, continuous method for knitting together proteinaceous food fragments.

It is still another object of this invention to provide an improved method for making cube steaks.

Still another object of this invention is to provide an improved apparatus for making cube steaks.

SUMMARY OF THE INVENTION

The foregoing objects, along with other objects features and advantages of the invention are achieved in an apparatus for knitting proteinaceous fragments into a unified mass. The apparatus is designed to accumulate the cut fragments into a wad and then knit the wad into a unified, proteinaceous mass, such as a cube steak.

The method for knitting proteinaceous fragments into a unified mass comprises the steps of accumulating the fragments into a wad and then knitting the wad into a unified proteinaceous mass.

BRIEF DESCRIPTION OF THE DRAWINGS

The apparatus and method of the invention, along with the objects, features and advantages thereof, can be more fully understood by reading the following detailed description in conjunction with the accompanying drawings in which:

FIG. 2 is a sectional view, taken along lines 2—2 of FIG. 1, of a portion of the apparatus in one stage of operation;

FIG. 3 is a sectional view of the apparatus in another stage of operation;

FIG. 5 is a sectional view, partially cutaway, of a portion of the apparatus shown in FIG. 1; and FIG. 6 is a sectional view of another aspect of the apparatus of the invention.

DETAILED DESCRIPTION OF AN EXEMPLARY EMBODIMENT

Figure 1:
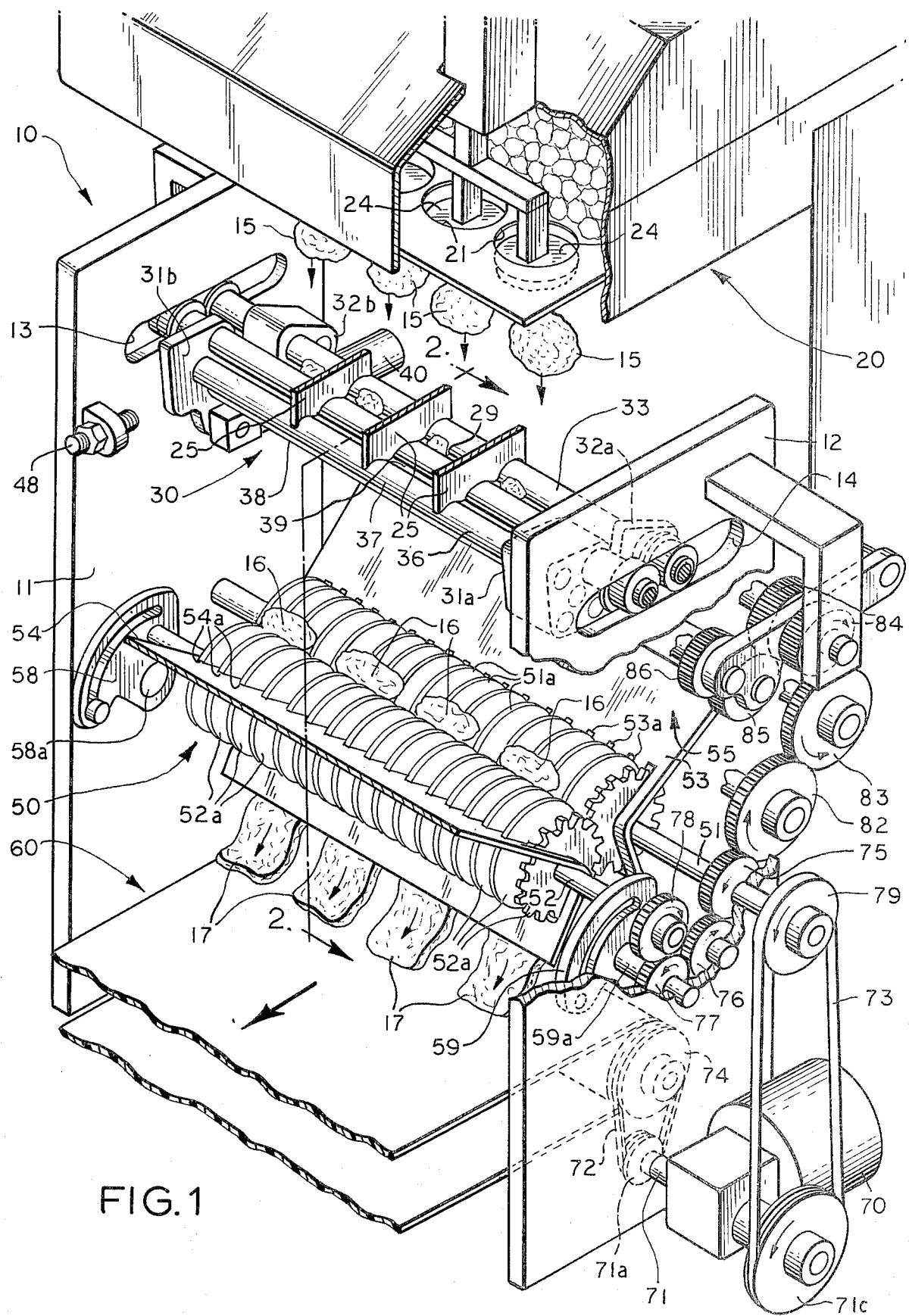
FIG. 1 is a perspective view of one aspect of the apparatus of the invention.

In one aspect of the invention, an apparatus 10 shown in FIG. 1 is adapted to receive a plurality of proteinaceous fragments such as relatively small meat fragments 15, and convert them into patties 17 sometimes colloquially referred to as cube steaks. This is accomplished by passing measured quantities of fragments 15 from dispensing means 20 to accumulator means 30, where they are rolled and jostled into a wad. The fragments comprising wad 16 are then knitted and tenderized by knitting means 50 to form patties 17. As explained hereinafter in connection with the description of FIG. 6, in another aspect of the invention the proteinaceous fragments 15 are knitted in a preliminary stage 51' in advance of accumulator means 30. A further aspect of the invention incorporates additional accumulator and knitting means sequentially disposed below knitting means 50 to further shape, wad, tenderize and knit patties 17.

Still referring to FIG. 1, the apparatus 10 for knitting proteinaceous fragments into patties is shown. Apparatus 10 includes dispensing means 20, comprising a plurality of cavities 21 of predetermined size. Fragments 15 are conveyed into cavities 21 by conventional means, and when filled, cavities 15 contain the exact quantity of meat necessary to form completed patties 17. Dispensing means 20 further include a corresponding plurality of pistons 22 which are energized to urge each group of fragments out of cavities 21 and into accumulator means 30 when cavities 21 are filled. Dividers 25 in accumulator means 30 maintain each group of fragments passed from dispensing means 20 segregated to insure each completed patty 17 is of uniform size and weight.

As shown in FIGS. 1–3, each group of fragments 15 passed from dispensing means 20 is rolled and jostled in accumulator means 30 to form a wad 16. Accumulator means 30 are supported by a pair of upright members 11 and 12, each having a horizontally disposed slot 13 and 14. Aligned with slots 13 and 14, near the extreme ends of accumulator means 30, are a first gear box 31a and a first plate 31b. A second gear box 32b and a second plate 32a are also aligned with slots 13 and 14 in spaced relationship behind first plate 31b and first gear box 31a, respectively. Secured between first gear box 31a and first plate 31b are a plurality of cylindrical accumulator rollers 36, 37 and 38, and secured between second gear box 32a and second plate 32b are a plurality of cylindrical accumulator rollers 33, 34 and 35. Accumulator rollers 33–38 define an accumulating spaced 39 wherein the groups of proteinaceous fragments dispensed from means 20 are accumulated into wads. As shown most clearly in FIG. 1, the ends of accumulator rollers 33 and 36 extend through slots 13, 14 to provide support for accumulator means 30.

An elongate gap 29, defined by accumulator rollers 33 and 36, serves as an input port to accumulating space 39. Thus, the groups of fragments 15 fall by the force of gravity from dispensing means 20, through gap 29, and into accumulating space 39. In a manner explained more fully below, accumulator rollers 33–38 are all adapted to rotate in the same direction, whereby the individual fragments 15 comprising each group formed by dispensing means 20 are continuously rolled and jostled together inside accumulating space 39. This rolling and jostling causes each group of fragments 15 to become knitted into a wad 16.

After fragments 15 have been knitted into wads 16, the wads are passed to the next stage of apparatus 10 referred to as knitting means 50. The passage of wads 16 into knitting means 50 is accomplished by causing first gear box 31a and first plate 31b to pivot above accumulator roller 36, and second gear box 32b and second plate 32a to pivot about accumulator roller 33 as shown in FIG. 3. When this occurs, accumulator rollers 38 and 35 spread apart to form an exit port 49 for dropping wads 16 into knitting means 50.

The movement of first gear box 31a, and first plate 31b, and the movement of second gear box 32b and second plate 32a about accumulator rollers 36 and 33, respectively, is achieved by the operation of actuation means such as an air cylinder 40. Air cylinder 40 is secured at a pivot 43 to an arm 45 extending downwardly from second plate 32a. A piston 41, having a linkage 42 secured thereto slidably cooperates with air cylinder 40, and upon the actuation thereof expands outwardly from air cylinder 40. Linkage 42 is secured at a pivot 44 to an arm 46 extending downwardly from gear box 31a. Thus, when air cylinder 40 is actuated by any conventional means (not shown), piston 41 causes linkage 42 to exert a force against arm 46 at pivot 44, causing first gear box 31a to pivot about accumulator roller 36. Simultaneously, piston 41 causes air cylinder 40 to exert a force against arm 45 at pivot 43, causing second plate 32a to pivot about accumulator roller 33.

For the purpose of limiting the size of exit port 49, defined by the separation of accumulator rollers 38 and 35, apparatus 10 further includes a pair of adjustable stops 47, 48. Stops 47, 48 are adjustably disposed in spaced relationship with second plate 32a and first gear box 31a, respectively. Thus, upon actuation of air cylinder 40, second plate 32a and first gear box 31a pivot about accumulator rollers 33 and 36 until restrained by adjustable stops 47, 48. In this manner, stops 47, 48 adjustably determine the size of exit port 49. More particularly, if the size of exit port 49 is to be increased, for the purpose of accommodating relatively larger wads 16, stops 47, 48 are retracted to a position further away from second plate 32a and first gear box 31a. On the other hand, if exit port 49 is to be decreased in size, stops 47, 48 are advanced closer to second plate 32a and first gear box 31a.

As explained hereinbefore, the actuation of air cylinder 40 causes exit port 49 to increase in size until it is large enough for wads 16, formed inside accumulating space 39, to drop into knitting means 50. Knitting means 50 includes funneling means 55, defined by a first angled member 53 and a second angled member 54. Angled members 53 and 54 are disposed in a substantially V shape beneath accumulating means 30, and serve to guide the wads 16, dropped from exit port 49, into knitting means 50.

Knitting means 50 further includes a first drive shaft 51 and a second drive shaft 52 disposed in spaced relationship near the bottom of funneling means 55, and extending substantially parallel to accumulator rollers 33–38. Drive shafts 51 and 52 carry a plurality of concentrically disposed circular blades 51a and 52a, respectively. Blades 51a and 52a have serrated edges as shown in FIGS. 2 and 3 though, for purposes of clarity, these serrations are not illustrated in FIG. 1. Blade means 51a and 52a pass through a corresponding plurality of blade openings 53a and 54a disposed in angled members 53 and 54, respectively.

Blade openings 53a and 54a permit blade means 51a and 52a to pass unimpeded through angled members 53 and 54. However, blade openings 53a and 54a are too narrow to permit passage of any substantial meat fragments which may cling to blade means 51a and 52a. Thus, these meat fragments will be stripped off of blade means 51a and 52a by angled members 53 and 54 as blade means 51a and 52a pass through blade openings 53a and 54a, respectively. As explained in connection with the description of FIG. 4, shaft 52 is adapted to swing out, thereby facilitating the removal of meat fragments from angled members 53 and 54, and the general cleaning of knitting means 50.

Drive shafts 51 and 52, and hence circular blades 51a and 52a, are adapted to rotate in opposite directions. Thus, when wads 16 are guided by funneling means 55 between blades 51a and 52a, they are knitted into patties 17. Patties 17, sometimes colloquially referred to as cube steaks, emerge from between shafts 51 and 52 at the bottom of knitting means 50. As shown most clearly in FIG. 1, patties 17, upon emerging from knitting means 50, are passed to conveying means 60, where they can be transported to inspecting, freezing and packaging stations (not shown).

Alternatively, another accumulator stage, such as accumulator means 30, and another knitting stage, such as knitting means 50, can be sequentially disposed in place of conveying means 60 below knitting means 50. These additional stages would provide further shaping, wadding, tenderizing and knitting of patties 17, thereby insuring a more appetizing cube steak at the output of apparatus 10.

Figure 4:
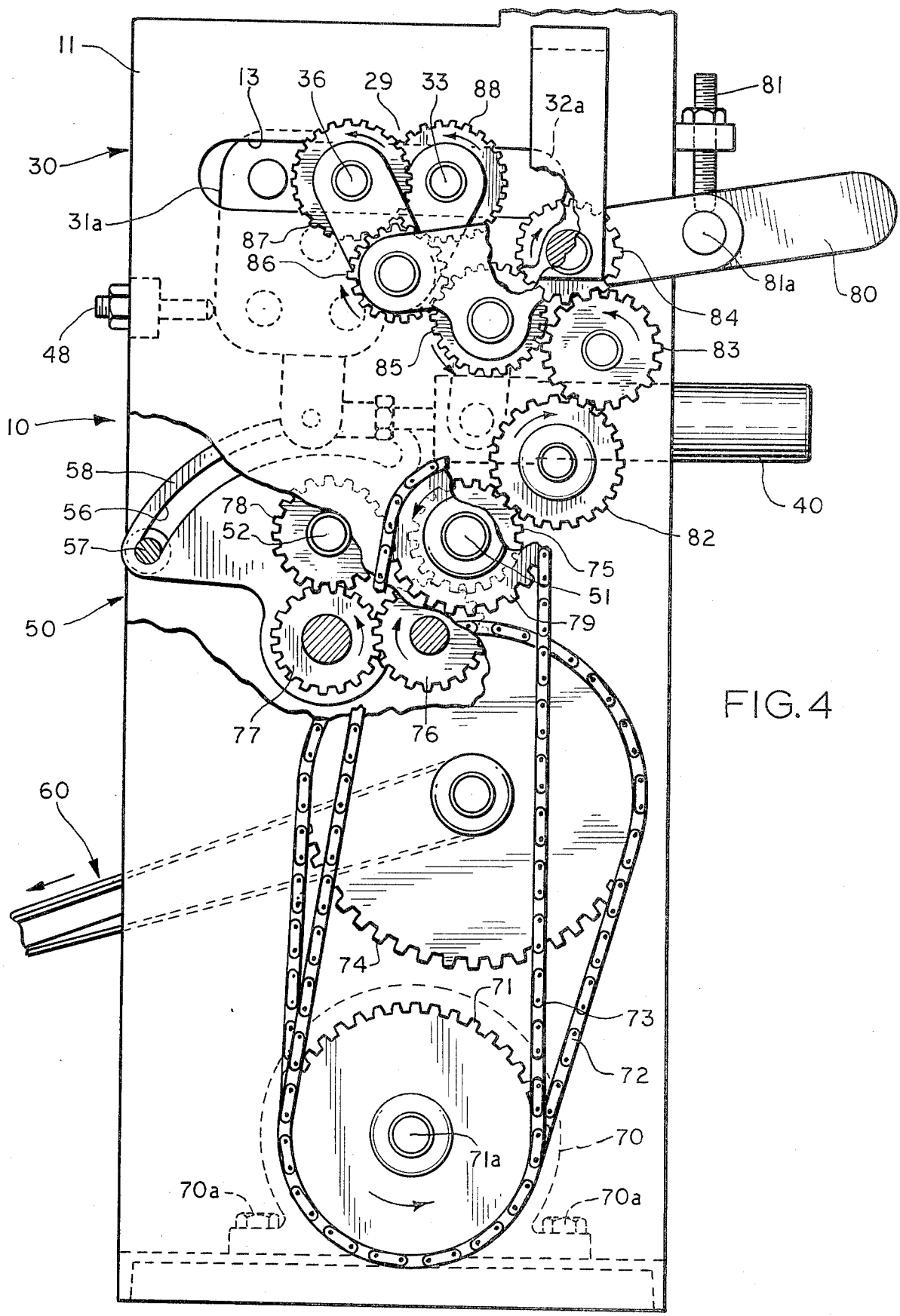
FIG. 4 is a side view, partially cutaway, of the apparatus shown in FIG. 1.

The manner in which the accumulator rollers of accumulator means 30 and the drive shafts of knitting means 50 are energized is illustrated by referring to FIGS. 1 and 4. More particularly, in both FIG. 1 and FIG. 4 there is shown a motor 70 secured to apparatus 10 by any suitable means such as bolts 70a. Motor 70 has a rotor 71 to which is secured a motor drive gear 71a. A drive chain 72 is secured between drive gear 71a and a conveyor drive gear 74 for energizing conveying means 60.

A knitting means drive chain 73 is also secured about a third drive gear 71c, and is fitted around a knitting means drive gear 79, imparting rotational motion thereto. Drive gear 70 cooperates with drive shaft 51, causing shaft 51 to rotate in a counterclockwise direction. A concentric drive gear 75 also cooperating with shaft 51 indirectly imparts rotational motion to a second knitting means drive gear 78 via a pair of intermeshed idler gears 76 and 77. Drive gear 78, which cooperates with drive shaft 52, causes drive shaft 52 to rotate in a clockwise direction. Accordingly, drive shafts 51 and 52, and blade means 51a and 52a secured respectively thereto, rotate in opposite directions. The meat fragments are thus tenderized, and simultaneously interleaved or knitted together by blade means 51a and 52a as they are rotated by drive shafts 51 and 52, respectively.

As shown in FIGS. 1 and 4, access to inner workings of compressing means 50, such as for cleaning purposes, can be obtained without upsetting the interplay between gears 75–78. In particular, there is provided a pair of flanges 58, 59 swivelably secured to upright members 11, 12, respectively, by means 58a and 59a. Flanges 58, 59 cooperate with opposite ends of shaft 52, and being identical, only the details of flange 58 are described herein.

In order to provide access to the interior of knitting means 50, and to adjust apparatus 10 to accommodate wads of various sizes, an arcuate slot 56 is disposed in flange 58. Slot 56 is engageable by an adjustable bolt 57, horizontally disposed in upright member 11. Access and adjustment can thus be obtained by loosening bolt 57 and moving shaft 52 relative to shaft 51, causing flange 58 to swivel relative to upright member 11. As this occurs, bolt 57 rides along arcuate slot 56, and drive gear 72 walks around idler gear 71 without disengaging any of gears 75–78. Thus, shaft 52, angled member 54 and blades 54a, can be moved clear of shaft 51, angled member 53 and blades 53a to facilitate the cleaning of knitting means 50. After cleaning, knitting means 50 can be returned to its original position by pushing shaft 52 back toward shaft 51.

In addition to energizing drive shafts 51 and 52, drive roller 75 also energizes accumulator rollers 33–38. More particularly, drive roller 75 is coupled through a series of idler rollers 82, 83, 84, 85 and 86 to accumulator rollers 33 and 36. As shown in FIG. 4, idler roller 86 rotates in a clockwise direction, whereby accumulator rollers 33 and 36 both rotate in a counterclockwise direction.

The manner in which the counterclockwise rotation of accumulator rollers 33 and 36 causes the remaining accumulator rollers 34, 35, 37 and 38 to rotate in the same direction can be explained by referring to FIG. 5. FIG. 5 shows a portion of the interior of gear box 32a, and includes an idler gear 91 which is intermeshed with an accumulator gear 88 disposed on accumulator roller 33. Thus, the counterclockwise rotation of accumulator roller 33 causes accumulator gear 88 to impart a clockwise rotation to idler gear 91.

A second idler gear 92 is disposed on the same shaft as idler gear 91, and thus also rotates in a clockwise direction. Idler gear 92, however, is meshed with an accumulator gear 95 disposed on accumulator roller 34. Accordingly, the clockwise rotation of idler gear 92 imparts counterclockwise rotation to accumulator gear 95, and hence to accumulator roller 34. Also meshed with accumulator gear 95 is another idler gear 94, and as a result, idler gear 94 rotates in a clockwise direction. Disposed on the same shaft with idler gear 94 is another idler gear 93 which also rotates clockwise. Idler gear 93 is meshed with an accumulator gear 96 which is disposed on accumulator roller 35, thereby causing accumulator roller 35 to rotate counterclockwise. In the same manner, gear box 31a includes a similar array of idler gears and accumulator rollers 36, 37 and 38. Accordingly, all six accumulator rollers are adapted to rotate in the same direction.

Returning now to FIG. 4, a feature of apparatus 10 and in particular, a feature of accumulator means 30 is shown. This feature permits the adjustment of gap 29 by selectively adjusting the space between accumulator rollers 33 and 36. This is accomplished through means of an adjustment screw 81 adapted to contact a pressure point 81a on a lever 80. Idler gears 84, 85 and 86 are all fixed relative to lever 80, whereby the movement thereof causes a corresponding movement in gears 84, 85 and 86. If lever 80 is urged down, for example, the center of idler gear 84 serves as a pivot point causing idler gear 84 to walk around gear 83 without disengaging gears 85 and 86. Thus, as lever 80 pivots about the center of gear 84, idler gear 86 moves upwardly causing accumulator rollers 36 and 33 to move apart along slot 13, thereby enlarging gap 29. Adjustment screw 81 can then be moved down to maintain lever 80, and hence gap 29, in position. To close gap 29, adjustment screw 81 need only be moved upwards, thereby raising lever 80 and moving accumulator rollers 36 and 33 closer together.

It should be noted that the gear train hereinbefore described is not the only means by which accumulator rollers 33–38 and drive shafts 51 and 52 can be turned. Alternatively, hydrolic motors can be operatively connected to turn rollers 33–38 in the same direction, and shaft 51 and 52 in the opposite direction. Moreover, because of their reliability, safety and economy, such hydrolic systems may possess certain advantages over the mechanical gear train described.

Having described the fundamental elements and features of the apparatus of the invention, the operation of apparatus 10' shown in FIG. 6 can now be explained. Apparatus 10' is similar to the apparatus 10 shown in FIG. 1, but for the addition of a second knitting stage 50' illustrated in advance of accumulator 30 in FIG. 6. Stage 50' is virtually identical to the knitting means 50 described above. Accordingly, when meat fragments 15 are guided by funneling means 55' between blades 51a' and 52a' of stage 50', the fragments are tenderized and automatically knitted together. Fragments 15 are then dropped through gap 29 defined by accumulator rollers 33 and 36, and into accumulating space 39 of accumulator means 30. As explained hereinbefore, accumulator rollers 33–38 of accumulator means 30 rotate in the same direction, causing fragments 15 to be rolled and jostled inside accumulating space 39. As a result, fragments 15 are wadded, and then discharged at exit port 49, upon actuation of air cylinder 40 in a manner explained in detail hereinbefore.

After the wad is discharged through exit port 49, it is guided by funneling means 55 between blades 51a and 52a. Blades 51a and 52a further tenderize and knit the wad into a completed patty or cube steak. If desired, additional accumulator stages and knitting stages can be sequentially deployed below knitting means 50 to provide a more tenderized and hence more appetizing product.

In view of the foregoing, it is clear that the invention permits choice proteinaceous fragments to be salvaged by knitting them together to form a high quality food product. It will be apparent to those skilled in the art, however, that many modifications, improvements, and variations can be made without departing from the true scope of the invention. Thus, all such modifications, improvements and variations are intended to be covered by the appended claims.

We claim:

1. An apparatus for knitting proteinaceous fragments into a unified mass comprising:
   accumulator means, including a plurality of same-rotating rollers defining an accumulating space, for rolling said fragments into a wad;
   actuating means for separating said same-rotating rollers to form an exit for allowing said wad to pass out of said accumulating space; said actuating means being adapted to close said exit after said wad has passed out of said accumulating space; and
   knitting means, for receiving said wad from said accumulator means, and knitting said wad into a unified proteinaceous mass.

2. An apparatus for knitting proteinaceous fragments into a unified mass comprising:
   accumulator means, defining a substantially enclosed accumulating space, wherein said fragments are rolled upon themselves to form a wad; said accumulator means including means defining an inlet adapted to pass a quantity of fragments into said accumulating space, and means defining an exit adapted to pass said wad formed in said accumulating space therefrom; and
   knitting means, aligned with said exit, for receiving said wad from said accumulator means; said knitting means including a pair of spaced, oppositely-rotating shafts, having blade means disposed thereon, adapted to receive said fragments between said blade means whereby said wad is knitted into a unified proteinaceous mass.

3. The apparatus set forth in claim 2 wherein said accumulator means include a plurality of same-rotating rollers which define said accumulating space.

4. The apparatus set forth in claim 3 further including actuating means for separating said same-rotating rollers to form said exit for allowing said wad to pass from said accumulating space; said actuating means being adapted to close said exit after said wad has passed from said accumulating space.

5. The apparatus set forth in claim 2 further includes advance knitting means disposed in advance of said accumulator means for knitting said fragments before passage thereto.

6. The apparatus set forth in claim 2 further includes additional accumulator means, adapted to receive said mass from said knitting means and roll said mass into a rerolled wad; and additional knitting means, adapted to receive said rerolled wad from said additional accumulator means and reknit it into a proteinaceous mass.

7. A method for knitting proteinaceous fragments into a unified mass comprising the steps of:
   a. providing a predetermined quantity of said fragments;
   b. accumulating said quantity of fragments into a wad by rolling said fragments along a plurality of same-rotating rollers defining an accumulating space;
   c. knitting said wad into a unified proteinaceous mass by passing said wad between a pair of oppositely-rotating shafts disposed in spaced relationship from said accumulating space; said oppositely-rotating shafts having blades disposed thereon; and
   d. separating said same-rotating rollers to form an exit for allowing said wad to pass out of said accumulating space.

8. The method set forth in claim 7 further including, after the separation step, the step of:
   e. returning said same-rotating rollers to their position prior to the separation step, thereby closing said exit.

9. The method set forth in claim 7 wherein the accumulating step and the knitting step are repeated.

10. A method for knitting proteinaceous fragments into a unified mass comprising the steps of:
    a. providing groups of predetermined quantities of said fragments;
    b. separately accumulating each of said groups of fragments into wads by rolling each of said groups of fragments along a plurality of same-rotating rollers defining an accumulating space;
    c. knitting said wads into unified, proteinaceous masses by passing said wads between a pair of oppositely-rotating shafts disposed in spaced relationship from said accumulating space; said oppositely-rotating shafts having blades disposed thereon; and
    d. separating said same-rotating rollers to form an exit for allowing said wads to pass out of said accumulating space.

11. The method set forth in Claim 10 further includes, after the separation step, the step of returning said same-rotating rollers to their positions prior to the separation step, thereby closing said exit.

12. The method set forth in Claim 10 wherein the accumulating step and the knitting step are repeated.

* * * * *